United States Patent
Nakagawa

(10) Patent No.: US 8,228,480 B2
(45) Date of Patent: *Jul. 24, 2012

(54) DISPLAY DEVICE AND MANUFACTURING METHOD OF DISPLAY DEVICE

(75) Inventor: Hidetoshi Nakagawa, Tsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 209 days.

This patent is subject to a terminal disclaimer.

(21) Appl. No.: 12/439,715

(22) PCT Filed: Apr. 6, 2007

(86) PCT No.: PCT/JP2007/057786
§ 371 (c)(1),
(2), (4) Date: Mar. 3, 2009

(87) PCT Pub. No.: WO2008/050501
PCT Pub. Date: May 2, 2008

(65) Prior Publication Data
US 2010/0020270 A1    Jan. 28, 2010

(30) Foreign Application Priority Data
Sep. 29, 2006  (JP) .................. 2006-267885

(51) Int. Cl.
    *G02F 1/13* (2006.01)
(52) U.S. Cl. ............ 349/192; 349/73; 349/74; 349/128; 445/24
(58) Field of Classification Search .................. 349/192, 349/73, 74, 128; 445/24
See application file for complete search history.

(56) References Cited

U.S. PATENT DOCUMENTS

| | | | |
|---|---|---|---|
| 5,132,819 A * | 7/1992 | Noriyama et al. | 349/55 |
| 6,335,771 B1 * | 1/2002 | Hiraishi | 349/42 |
| 6,384,889 B1 * | 5/2002 | Miyachi et al. | 349/143 |
| 6,548,831 B1 | 4/2003 | Tokuhiro et al. | |
| 6,710,825 B2 * | 3/2004 | Kubo et al. | 349/48 |
| 6,753,253 B1 | 6/2004 | Takahashi et al. | |
| 7,110,075 B2 * | 9/2006 | Tak et al. | 349/129 |
| 2001/0028418 A1 * | 10/2001 | Ozaki et al. | 349/54 |
| 2002/0180920 A1 | 12/2002 | Nog et al. | |

(Continued)

FOREIGN PATENT DOCUMENTS
JP    62-038423    2/1987
(Continued)

OTHER PUBLICATIONS

Supplementary European Search Report, dated Dec. 10, 2010 corresponding to EP 07 74 1222.

(Continued)

*Primary Examiner* — Edward Glick
*Assistant Examiner* — Sang Nguyen
(74) *Attorney, Agent, or Firm* — Nixon & Vanderhye P.C.

(57) ABSTRACT

A liquid crystal device 1 of the present invention includes a first conductive layer 20 and a second conductive layer 21 arranged across an insulating layer from the first conductive layer 20. A crossover section 40 at which the first conductive layer 20 and the second conductive layer 21 intersect each other is provided. At least one of the first conductive layer 20 and the second conductive layer 21 includes a slit portion 210*a* and a cutout portion 201*b*, which are arranged in the crossover section 40 so that the cutout portion 210*b* is at a predetermined distance from the slit portion 210*a*.

4 Claims, 13 Drawing Sheets

U.S. PATENT DOCUMENTS

| | | | |
|---|---|---|---|
| 2003/0107040 A1* | 6/2003 | Tokuhiro et al. | 257/72 |
| 2005/0030459 A1* | 2/2005 | Song et al. | 349/129 |
| 2006/0012729 A1 | 1/2006 | Tanaka et al. | |
| 2006/0262261 A1 | 11/2006 | Takeda et al. | |
| 2010/0141883 A1* | 6/2010 | Nakagawa | 349/139 |

FOREIGN PATENT DOCUMENTS

| | | | |
|---|---|---|---|
| JP | 63-221325 | | 9/1988 |
| JP | 03-036750 | | 2/1991 |
| JP | 04-018730 | | 1/1992 |
| JP | 05-232503 | | 9/1993 |
| JP | 07-028076 | | 1/1995 |
| JP | 07-092489 | | 4/1995 |
| JP | 11-340334 | * | 12/1999 |
| JP | 2000-235190 | | 8/2000 |
| JP | 2001-083522 | | 3/2001 |
| JP | 2002-090775 | | 3/2002 |
| JP | 2003-021845 | | 1/2003 |
| JP | 2004-221207 | | 8/2004 |
| JP | 2004-347891 | * | 9/2004 |
| JP | 2004-347891 | * | 12/2004 |
| JP | 2006-030627 | | 2/2006 |

OTHER PUBLICATIONS

International Search Report for PCT/JP2007/057786 mailed May 22, 2007.

U.S. Appl. No. 12/596,745, filed Oct. 20, 2009; Nakagawa.

Office Action from U.S. Appl. No. 12/596,745 dated Oct. 20, 2011; Nakagawa.

* cited by examiner

DISPLAY DEVICE AND MANUFACTURING METHOD OF DISPLAY DEVICE

This application is the U.S. national phase of International Application No. PCT/JP2007/057786 filed 6 Apr. 2007 which designated the U.S. and claims priority to Japanese Patent Application No. 2006-267885 filed 29 Sep. 2006, the entire contents of each of which are hereby incorporated by reference.

TECHNICAL FIELD

The present invention relates to a display device and a manufacturing method of a display device.

BACKGROUND ART

A display device, such as a liquid crystal display device, an EL display device or a plasma display device, is conventionally known, in which pixel electrodes are arranged in a matrix on a transparent substrate. A voltage is applied individually to each pixel electrode in order to form an image. An active matrix driving method is known as a driving method for the display device. In the active matrix display device, gate bus lines (or scanning lines) and source bus lines (or signal lines) are arranged in a grid pattern on the transparent substrate, while switching elements such as TFTs are provided in the vicinities of the respective intersections of the gate bus lines and the source bus lines.

Each TFT includes a gate electrode branching from the gate bus line, a source electrode branching from the source bus line, and a drain electrode connected to the pixel electrode, for example. Further, a transparent substrate that includes a counter electrode is provided so as to face the transparent substrate that includes the pixel electrodes. Each pixel is driven by a voltage that is applied between the pixel electrode and the counter electrode based on a signal from the source bus line, when a selection signal is received from the gate bus line.

In the display device, when a leak has occurred between intersecting wiring lines such as a source bus line and a gate bus line, a signal cannot be transmitted properly beyond the short-circuited portion of the source bus line. This will cause a linear area that includes defective display (i.e., line defect). The techniques described in Patent Documents 1 and 2 are known as methods for fixing a defect at the intersection between wiring lines, for example.
Patent Document 1: JP-A-S63-221325
Patent Document 2: JP-A-2004-347891

DISCLOSURE OF THE INVENTION

Problem to be Solved by the Invention

Patent Document 1 discloses a technique that provides a slit on each overlapping portion of a wiring line, so that a short-circuited portion can be isolated by forming laser-cut parts extending from the respective ends of the slit. Patent Document 2 discloses a technique that provides a plurality of parallel slits on each overlapping portion of a wiring line, so that the wiring line can be cut off at the slit-formed area.

According to the method thus cutting the slit-formed area by laser radiation in order to isolate a leak spot, isolation of a leak spot that includes a film residue or a foreign substance larger than the slit width cannot benefit from the use of the slits, for example. In this case, laser should cut the conductive film beyond the slit-formed area, while turning in direction. The turning angle of the laser cutting may be limited to 90 degrees. If not limited, a 90-degree turn is preferable for facilitating the operation. When the conductive film is thus cut out, the corner (corresponding to a turning point of the laser) is particularly prone to a defect of repair. Therefore, the laser cutting may fail to eliminate a leak completely. In order to deal with this problem, the length of the above slit can be increased. However, considerable increase of the slit length may cause increase of the wiring resistance, resulting in degradation of display performance.

The present invention was made in view of the foregoing circumstances, and an object thereof is to provide a display device in which a leak spot or the like on a conductive layer (or on a wiring part) can be suitably fixed without increasing the resistance, and further to provide a manufacturing method of the display device.

Means for Solving the Problem

In order to solve the above problem, a display device according to the present invention includes a first conductive layer, and a second conductive layer arranged across an insulating layer from the first conductive layer. An overlap section at which the first conductive layer and the second conductive layer overlap each other is provided. At least one of the first conductive layer and the second conductive layer includes a slit portion and a cutout portion, which are arranged in the overlap section so that the cutout portion is at a predetermined distance from the slit portion.

According to the present display device, when a fault such as a leak is generated in the overlap section at which the first conductive layer and the second conductive layer overlap each other, the area of the fault can be isolated by cutting off a portion of the conductive layer connecting the slit portion and the cutout portion so that the slit portion communicates with the cutout portion arranged at the predetermined distance from the slit portion. Thereby, a highly reliable conductive feature can be provided, which enables provision of a high quality display device. Further, due to the cutout portion provided at the predetermined distance from the slit portion in order to enable cutoff of a defective area, a defect over a relatively large area can be repaired. Compared to simply increasing the length of the slit portion in order to enable repair of a larger defective area, increase of the resistance of the conductive layer can be suppressed, which may prevent degradation of display performance. Note that the overlap section of the present invention also includes the periphery of a section at which the conductive layers overlap each other. Specifically, areas of the overlapping conductive layers in which a leak may occur due to intrusion of a foreign substance are included. A crossover section at which the conductive layers intersect each other can be an operative example of the overlap section.

The present invention may include a plurality of slit portions arranged parallel to one another, as the above slit portion, and further may include cutout portions arranged to correspond to the respective slit portions, as the above cutout portion. According to the construction, a defect over a relatively large area can be repaired. When a defect across a plurality of slit portions has occurred, for example, the portions of the conductive layer connecting the plurality of slit portions can be cut off. Further, due to the cutout portion provided at a predetermined distance from each slit portion, a defect over a large area extending thereto can be treated. Due to the parallel arrangement of the slit portions and further due to the cutout portions corresponding to the parallel slit portions, the cutting operation can be advanced in the longitudinal direction of the slit portions, or in a direction (i.e., the array direction of the slit portions) intersecting with the longitudinal direction. Thus, the cutting operation is facilitated.

The cutout portion can be arranged to be linearly aligned with the slit portion, for example. According to the construction, in the case that the cutting operation is achieved by using laser radiation, the laser scanning can be advanced in either of the vertical and horizontal directions which intersect each other at an angle of 90 degrees. Thus, the laser scanning is facilitated, and consequently the precision of irradiation can be improved. Specifically, a portion of the conductive layer connecting the slit portion and the cutout portion can be cut off along the longitudinal direction of the silt portion. A portion of the conductive layer connecting the parallel slit portions, or a portion of the conductive layer connecting the cutout portions arranged in a line can be cut off along the array direction of the slit portions.

The present invention may include a plurality of cutout portions arranged along the longitudinal direction of the slit portion, as the above cutout portion. The present construction enables repair of a further larger defective area while suppressing increase of the resistance of the conductive layer.

Moreover, cutout portions as the above cutout portion may be arranged in an array of rows and columns. According to the construction, the cutting operation for cutting off a portion of the conductive layer connecting the cutout portions can be advanced in the vertical or horizontal direction while involving 90-degree turns. Thus, the cutting operation is facilitated. Particularly in the case that the cutting operation is achieved by using laser radiation, a turning point at which the scanning laser turns 90 degrees can be set to a point within any of the cutout portions arranged in an array of rows and columns (i.e., the turning point can be set to a point within intangible portions of the conductive layer). Consequently, a defect of repair likely generated at the turning point (e.g., at the turning point of the scanning laser) can be prevented.

The above cutout portion can form a rectangular shape on which each side thereof is set to a length between 6.0 µm and 10.0 µm. The cutout portion thus constructed enables improvement in precision of the cutting operation in the case of laser cutting. That is, the cutting can be optimally achieved due to the cutout portion having a rectangular shape with 6.0 µm to 10.0 µm sides, because the laser beam width is several micrometers. If each side of the cutout portion is set to be less than 6.0 µm, the scanning laser may need to turn at a tangible portion of the conductive layer. If it is set to exceed 10.0 µm, the resistance of the conductive layer may be unnecessarily increased.

In order to solve the above problem, the present invention provides a manufacturing method of a display device that includes a first conductive layer and a second conductive layer arranged across an insulating layer from the first conductive layer. The manufacturing method includes forming the first conductive layer by a first conductive layer forming process, forming the insulting layer on the first conductive layer, and forming the second conductive layer on the insulating layer by a second conductive layer forming process so that an overlap section at which the second conductive layer overlaps with the first conductive layer is provided. Further included is fixing a fault by a repair process when the fault is generated in the overlap section. At least one of the first conductive layer forming process and the second conductive layer forming process includes forming a slit portion on at least one of the first conductive layer and the second conductive layer by a slit forming process, and further includes forming a cutout portion on the at least one of the first conductive layer and the second conductive layer by a cutout forming process, by which the slit portion and the cutout portion are formed in the overlap section so that the cutout portion is at a predetermined distance from the slit portion. The repair process includes cutting off an area of the fault by radiating a laser beam to a conductive layer portion that connects the slit portion and the cutout portion.

According to the present manufacturing method, the area of the fault can be suitably fixed. Thereby, a highly reliable conductive feature can be provided, which enables provision of a high-quality display device. Further, due to the cutout portion provided to enable cutoff of a defective area, a defect over a relatively large area can be repaired. Compared to simply increasing the length of the slit portion in order to enable repair of a larger defective area, increase of the resistance of the conductive layer can be suppressed, which may prevent degradation of display performance.

A plurality of slit portions arranged parallel to one another may be formed as the above slit portion by the slit forming process, and cutout portions arranged to correspond to the plurality of slit portions may be formed as the above cutout portion by the cutout forming process. According to the resultant construction, a defect over a relatively large area can be repaired. When a defect across a plurality of slit portions has occurred, for example, the portions of the conductive layer connecting the plurality of slit portions can be cut off. Further, due to the cutout portion provided at a predetermined distance from each slit portion, a defect over a large area extending thereto can be treated. Due to the parallel arrangement of the slit portions and further due to the cutout portions corresponding to the parallel slit portions, the cutting operation can be advanced in the longitudinal direction of the slit portions, or in a direction (i.e., the array direction of the slit portions) intersecting with the longitudinal direction. Thus, the cutting operation is facilitated. That is, during the laser cutting operation, the laser scanning can be advanced in either of the vertical and horizontal directions which intersect each other at an angle of 90 degrees. Thus, the laser scanning is facilitated, and consequently the precision of irradiation can be improved. Specifically, a portion of the conductive layer connecting the slit portion and the cutout portion can be cut off along the longitudinal direction of the silt portion. A portion of the conductive layer connecting the parallel slit portions, or a portion of the conductive layer connecting the cutout portions arranged in a line can be cut off along the array direction of the slit portions.

A plurality of cutout portions arranged along the longitudinal direction of the slit portion may be formed as the above cutout portion by the cutout forming process. The resultant construction enables repair of a further larger defective area while suppressing increase of the resistance of the conductive layer.

Further, cutout portions arranged in an array of rows and columns may be formed as the above cutout portion by the cutout forming process. According to the resultant construction, the cutting operation for cutting off a portion of the conductive layer connecting the cutout portions can be advanced in the vertical or horizontal direction while involving 90-degree turns. Thus, the cutting operation is facilitated. Specifically, a turning point at which the scanning laser turns 90 degrees can be set to a point within any of the cutout portions arranged in an array of rows and columns (i.e., the turning point can be set to a point within intangible portions of the conductive layer). Consequently, a defect of repair likely generated at the turning point (e.g., at the turning point of the scanning laser) can be prevented.

The cutout portion can be formed by the cutout forming process into a rectangular shape on which each side thereof is set to a length between 6.0 μm and 10.0 μm. The cutout portion thus constructed enables improvement in precision of the cutting operation. That is, the cutting can be optimally achieved due to the cutout portion having a rectangular shape with 6.0 μm to 10.0 μm sides, because the laser beam width is several micrometers. If each side of the cutout portion is set to be less than 6.0 μm, the scanning laser may need to turn at a tangible portion of the conductive layer. If it is set to exceed 10.0 μm, the resistance of the conductive layer may be unnecessarily increased.

Effect of the Invention

The present invention can provide a display device in which a leak spot or the like on a conductive layer (or on a wiring part) can be suitably fixed, without increasing the wiring resistance.

Further, the present invention can provide a manufacturing method of the display device that includes a process by which a leak spot or the like on a conductive layer (or on a wiring part) can be suitably fixed, without increasing the resistance.

EXPLANATION OF SYMBOLS

1: Liquid crystal display device (Liquid crystal device) 2: Substrate (Element substrate), 3: Substrate (Opposite substrate), 20: Storage capacitor line (First conductive layer), 21: Peripheral wiring line (Second conductive layer), 24: Gate insulator (Insulating layer), 40: Crossover section (Overlap section), 210a: Slit portion, 210b; Cutout portion.

BEST MODE FOR CARRYING OUT THE INVENTION

A d-splay device according to an embodiment of the present invention will be hereinafter explained with reference to the drawings. Specifically, a liquid crystal display device will be described as an embodiment of the display device.

Figure 1:
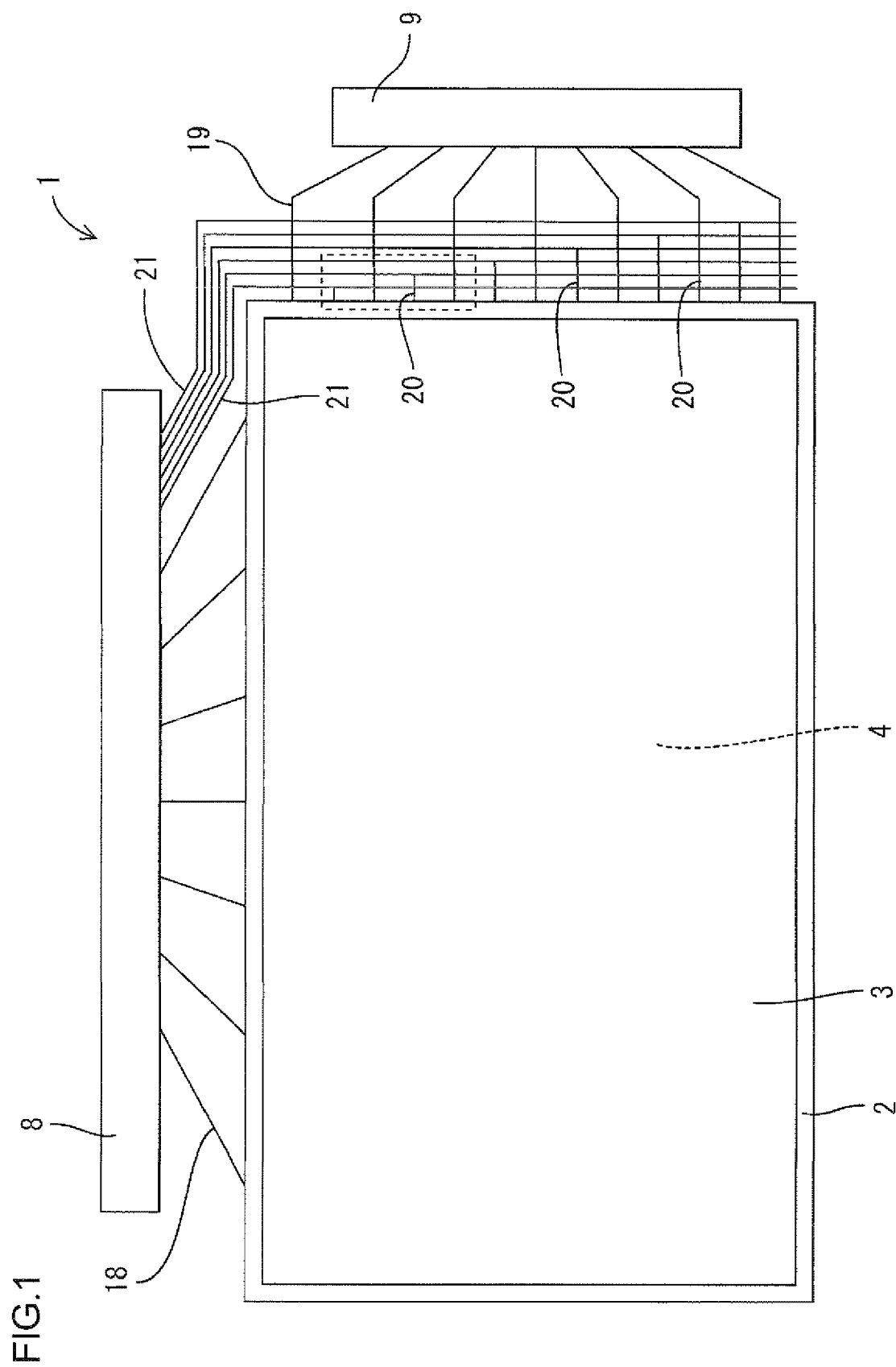
FIG. 1 is a plan view schematically showing the driver circuits and the wiring configuration of a liquid crystal display device according to the present embodiment.
Figure 7:
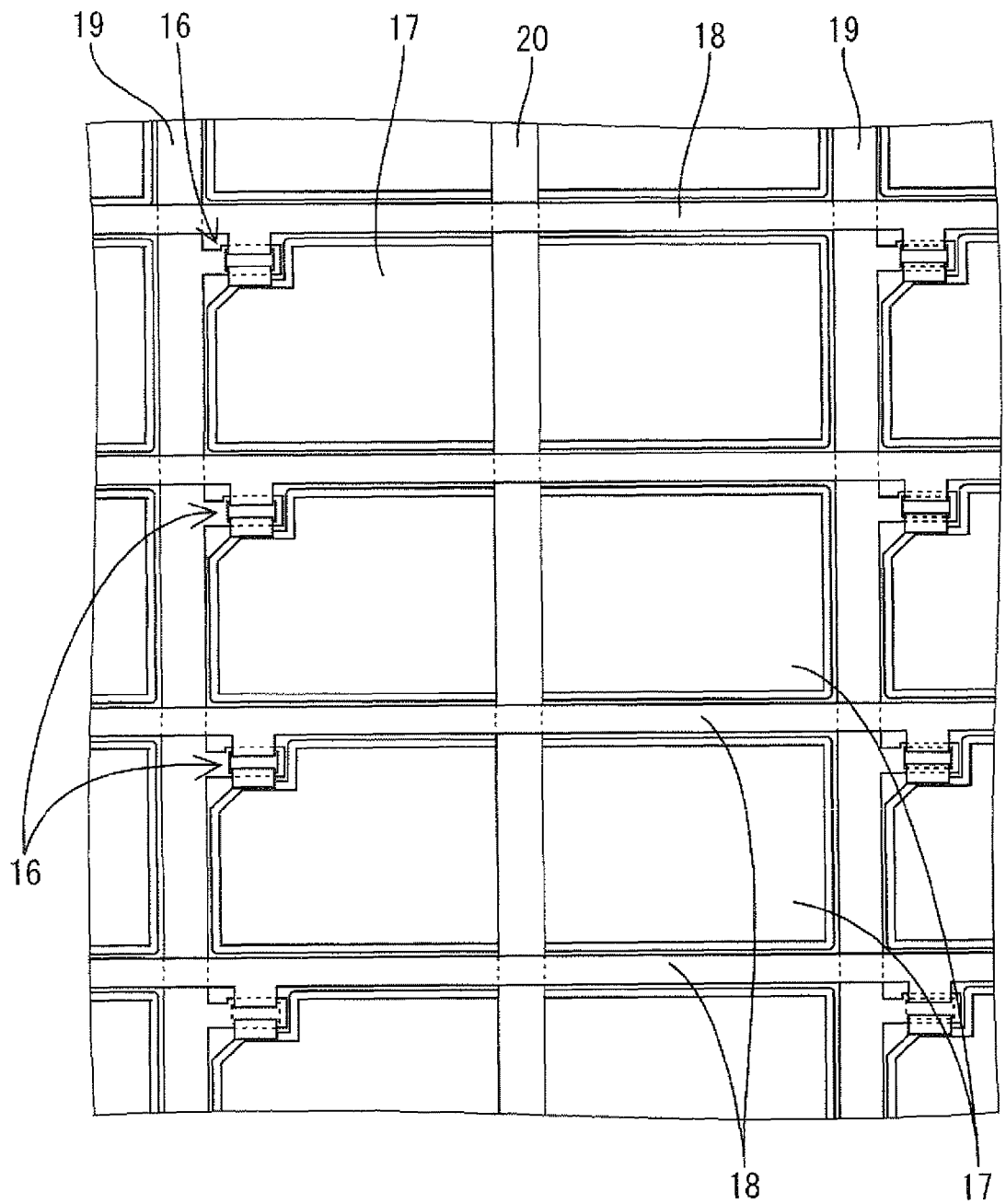
FIG. 7 is a schematic plan view showing the configuration of pixels.
Figure 8:
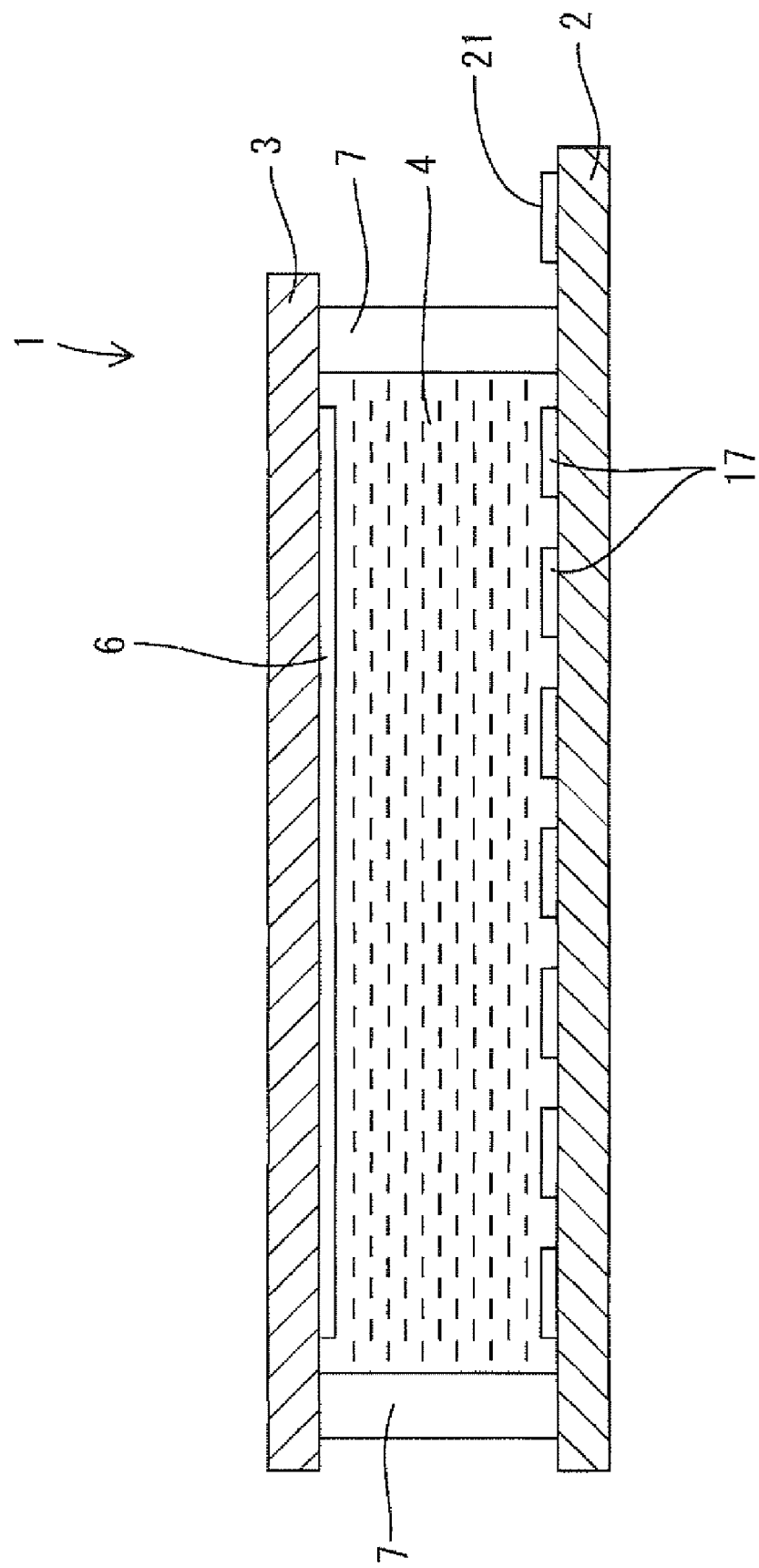
FIG. 8 is a diagram schematically showing the cross-sectional configuration of the liquid crystal display device according to the present embodiment.

FIG. 1 is a plan view schematically showing the driver circuits and the wiring configuration of the liquid crystal display device according to the present embodiment. FIG. 8 is a diagram schematically showing the cross-sectional configuration of the liquid crystal display device. FIG. 7 is a schematic plan view showing the configuration of pixels.

In the liquid crystal display device 1 of the present embodiment, a liquid crystal layer 4 is sandwiched between a pair of substrates 2, 3 so as to fill the rectangular area formed on the inner side of a sealant 7.

The substrate 2 is provided as an element substrate, which includes TFTs 16 as switching elements (See FIG. 7), and further includes pixel electrodes 17 arranged in a matrix and connected to the respective TFTs 16.

On the other hand, the substrate 3 is provided as an opposite substrate, which includes a common electrode 6 arranged solidly on the substrate surface.

Further, a plurality of data lines 18 for supplying an image signal from a source driver 8 to each pixel, a plurality of scanning lines 19 for supplying a scan signal from a gate driver 9 to the TFT 16 of each pixel, and storage capacitor lines 20 for supplying an electrical signal from the source driver 8 for the capacitance of each pixel are provided on the element substrate 2. The storage capacitor lines 20 are connected, via contact holes (described below), to peripheral wiring lines 21 connected to the source driver 8.

In each pixel section, as shown in FIG. 7, the liquid crystal layer 4 (or a liquid crystal element) and a storage capacitor are connected in parallel. When the TFT 16 is turned ON, an image signal (or a drive voltage) is written into the pixel section. The voltage is held on the storage capacitor even after the TFT 16 turns OFF, due to the storage capacitor line 20 arranged in the pixel section. The storage capacitors are formed of a gate insulator (described below) that is arranged between the storage capacitor lines 20 and the pixel electrodes 17.

Figure 2:
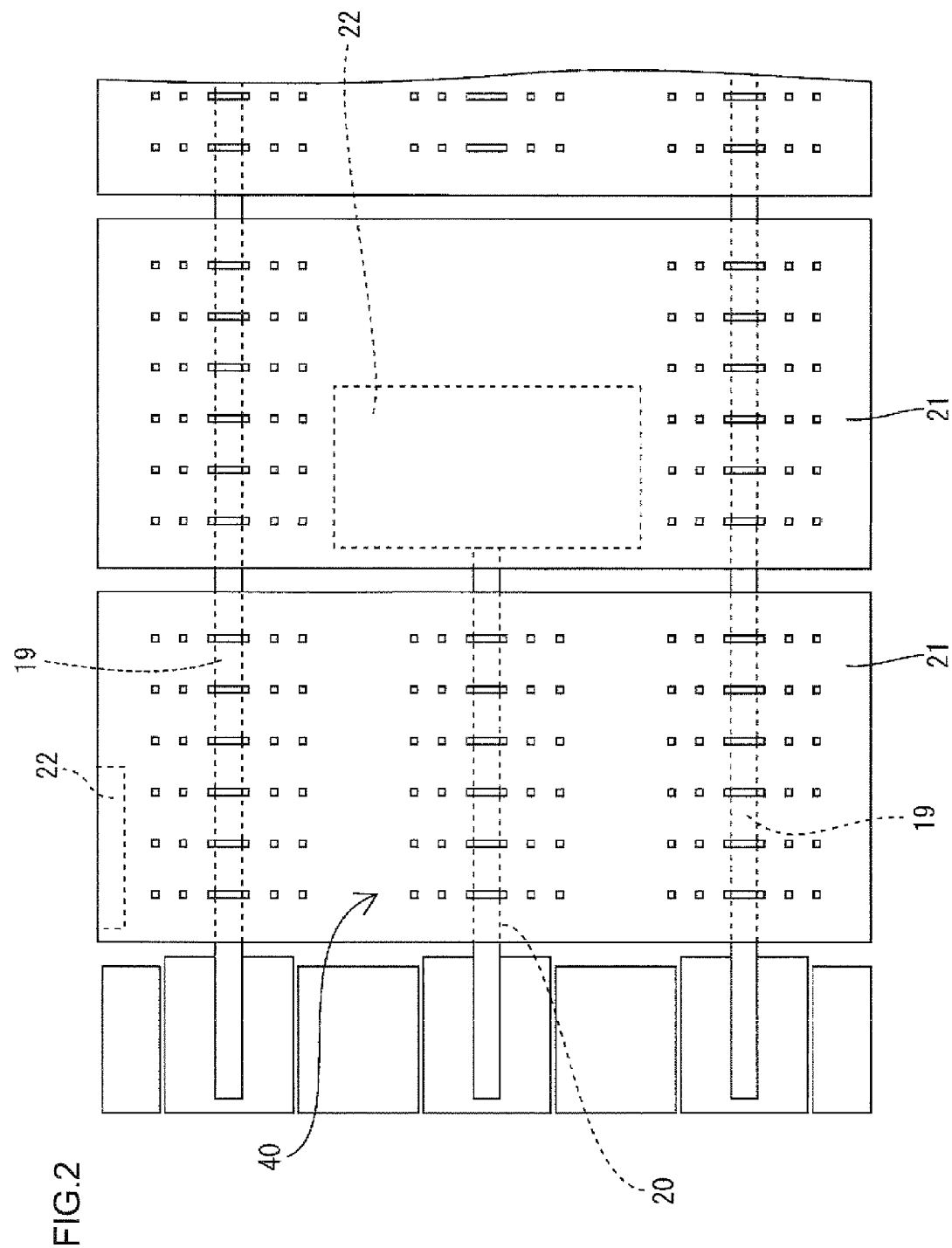
FIG. 2 is a partially-enlarged schematic plan view of FIG. 1.
Figure 3:
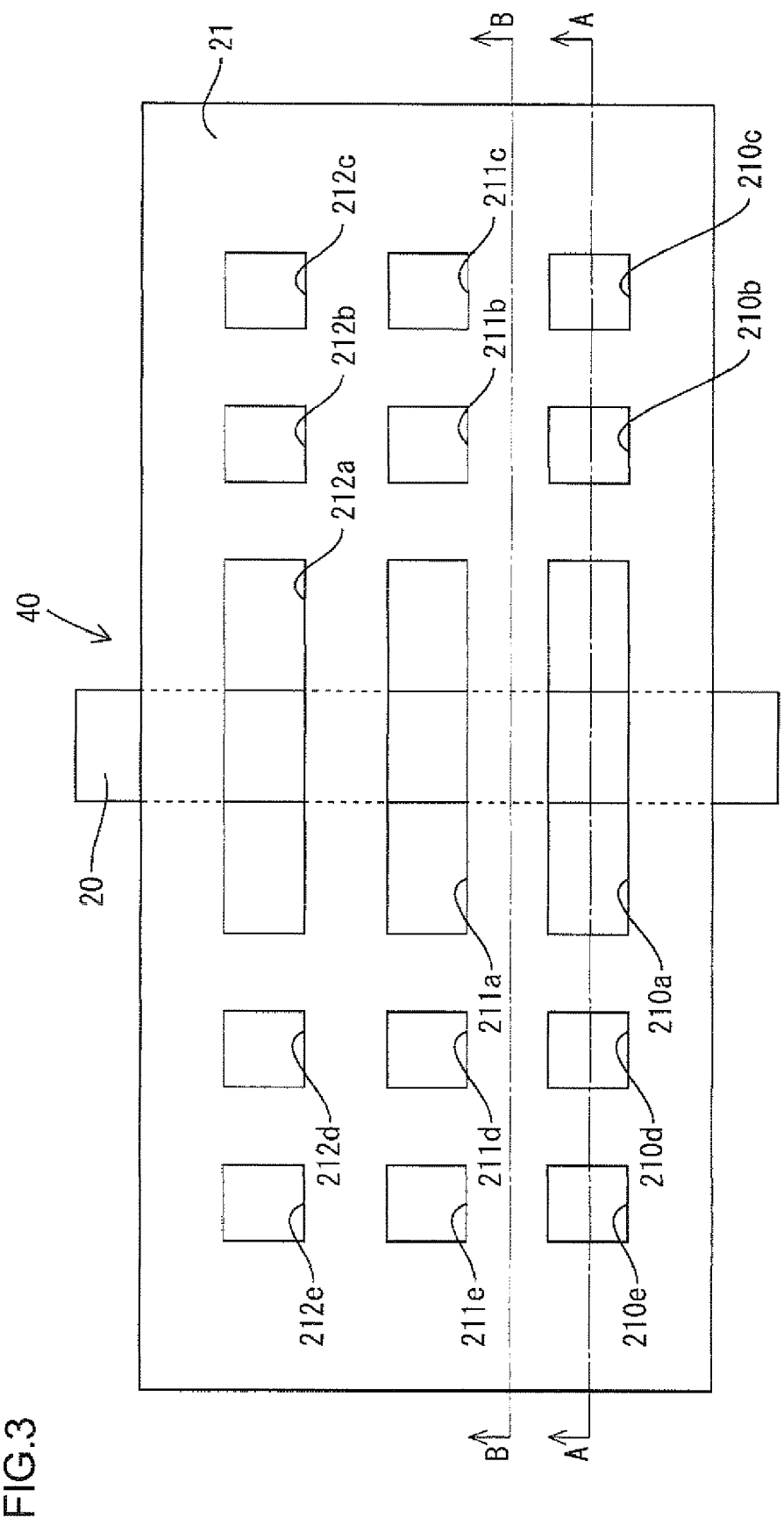
FIG. 3 is a partially-enlarged schematic plan view of FIG. 2.
Figure 4:
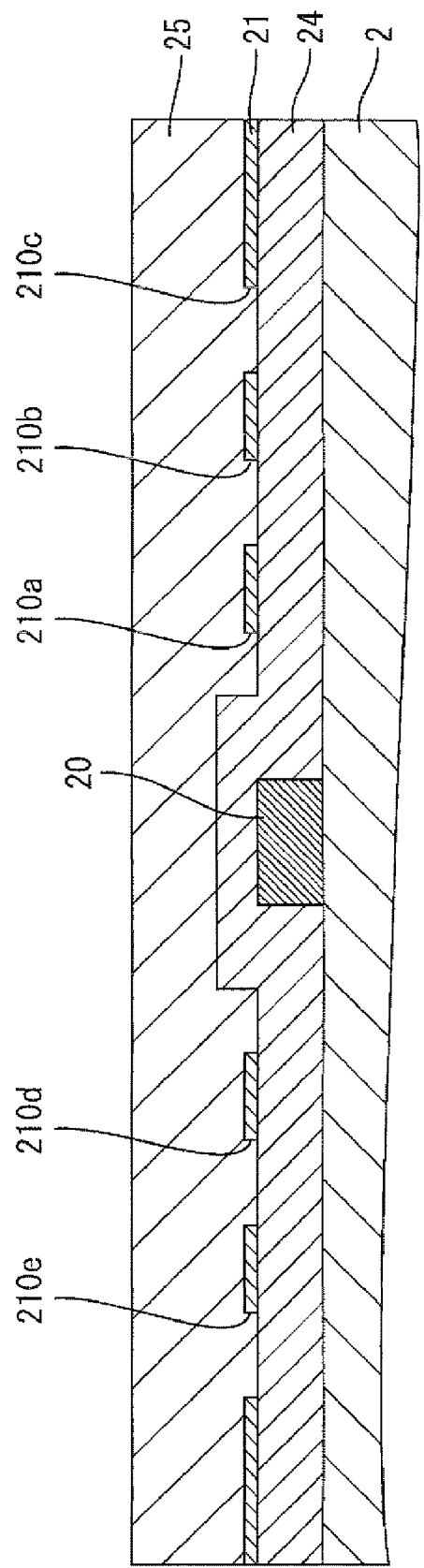
FIG. 4 is a schematic cross-sectional view of FIG. 3 along the line A-A.
Figure 5:
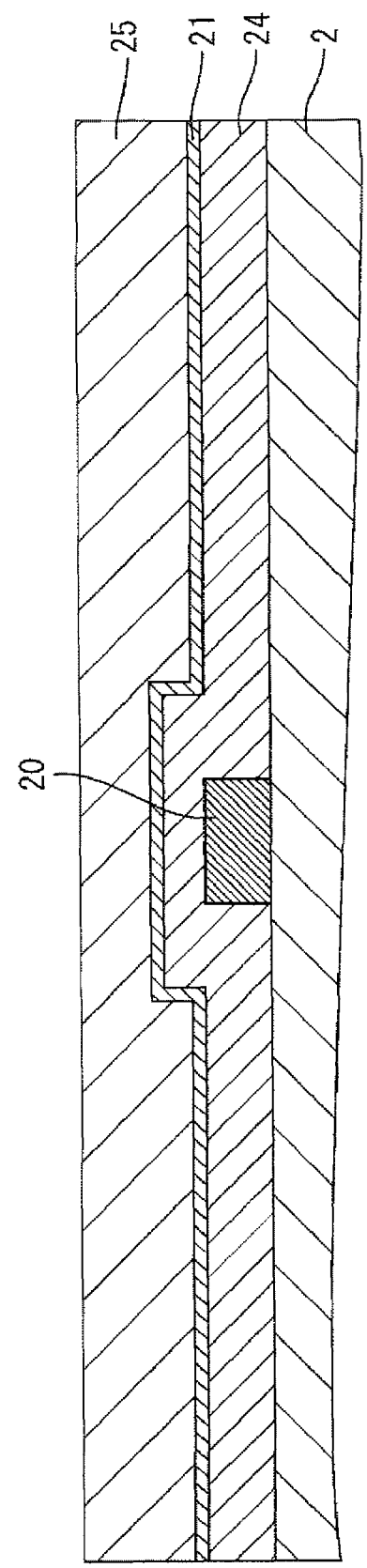
FIG. 5 is a schematic cross-sectional view of FIG. 3 along the line B-B.

FIG. 2 is a schematic plan view that magnifies the area bounded by a dashed line in FIG. 1. FIG. 3 is a partially-enlarged plan view of FIG. 2. FIG. 4 is a cross-sectional view of FIG. 3 along the line A-A. FIG. 5 is a cross-sectional view of FIG. 3 along the line B-B.

The peripheral wiring lines 21 (i.e., a second conductive layer) are connected to the storage capacitor lines 20 (i.e., a first conductive layer) via contact holes 22, so as to be capable of providing an electrical signal from the source driver 8 (See FIG. 1) to the storage capacitor lines 20. The peripheral wiring lines 21 are formed of a wiring layer (or a conductive layer) that is formed by the same process as for the data lines 1B. That is, the peripheral wiring lines 21 are formed of the same layer and the same material as the data lines 18. On the other hand, the storage capacitor lines 20 are formed of a wiring layer that is formed by the same process as for the scanning lines 19. That is, the storage capacitor lines 20 are formed of the same layer and the same material as the scanning lines 19. Consequently, the peripheral wiring lines 21 and the storage capacitor lines 20 are arranged in layers so as to form a lamination stack together with the gate insulator 24 arranged therebetween.

Referring to FIGS. 2 to 5, the peripheral wiring lines 21 and the storage capacitor lines 20 are arranged to intersect each other. In each crossover section 40 (or overlap section), fault repair slit portions 210a, 211a, 212a and the like (hereinafter sometimes collectively referred to as "slit portions 210a and the like") are provided, which are used for fixing a fault such as short circuit when the fault has occurred. The slit portions 210a and the like are formed on the peripheral wiring line 21. Further, in each crossover section 40, cutout portions 210b, 210c, 210d, 210e, 211b, 211c, 211d, 211e, 212b, 212c, 212d, 212e and the like (hereinafter sometimes collectively referred to as "cutout portions 210b and the like") are provided, which are arranged at a predetermined distance from the respective slit portions 210a, 211a, 212a and the like and along the longitudinal direction of the slit portions 210a, 211a, 212a and the like. The cutout portions 210b and the like are also provided as fault repair cutout portions used for fixing a fault, and are formed on the peripheral wiring line 21.

The slit portions 210a and the like are formed of a plurality of parallel slits arranged evenly spaced apart. The slit length is set to a value between 35.0 μm and 50.0 μm (e.g., 40.0 μm). The slit width is set to a value between 6.0 μm and 10.0 μm (e.g., 6.0 μm). The distance between adjacent slits (i.e., slit-to-slit distance, or pitch) is set to a value between 30.0 μm and 50.0 μm (e.g., 45.0 μm).

The cutout portions 210b and the like are arranged to be symmetrical with respect to the respective parallel slit portions 210a, 211a, 212a and the like, so that a plurality of cutout portions (e.g., a total of four cutout portions, two on the right side and two on the left side, in the present embodiment) are aligned along the longitudinal direction of each slit portion 210a, 211a, 212a or the like. That is, the cutout portions 210b and the like are scattered so as to form an array of rows and columns. Each cutout portion is formed into a rectangular shape, or more specifically, into a square shape, and one side thereof is set to a length between 6.0 μm and 10.0 μm (e.g., 8.0 μm). The distance between the cutout portions 201b and 210d, which are arranged across the slit portion 210a from each other, is set to a length between 60.0 μm and 100.0 μm (e.g., 90.0 μm). Thus, the distance between these cutout portions is set to be equal to the integral multiple of the above slit-to-slit distance. The distance between adjacent cutout portions (e.g., the distance between the cutout portions 210e and 210d) is set to a length between 15.0 μm and 25.0 μm (e.g., 22.5 μm).

The scanning lines 19 and the storage capacitor lines 20 can be formed of a conductive material having a Ti/Al/Ti structure, for example. The data lines 18 and the peripheral wiring lines 21 can be formed of a conductive material having a Ti/Al structure, for example. The gate insulator 24 arranged between the storage capacitor lines 20 and the peripheral wiring lines 21 can be formed of silicon oxide, or alternatively, can be formed of a laminated film, such as a laminated film of silicon oxide and a semiconductive material, a laminated film of silicon oxide, a semiconductive material and SOG (Spin On Glass), or a laminated film of silicon oxide and SOG (Spin On Glass). As shown in FIGS. 4 and 5, a passivation film 25 formed of silicon oxide and the like is provided on the peripheral wiring lines 21.

Figure 6:
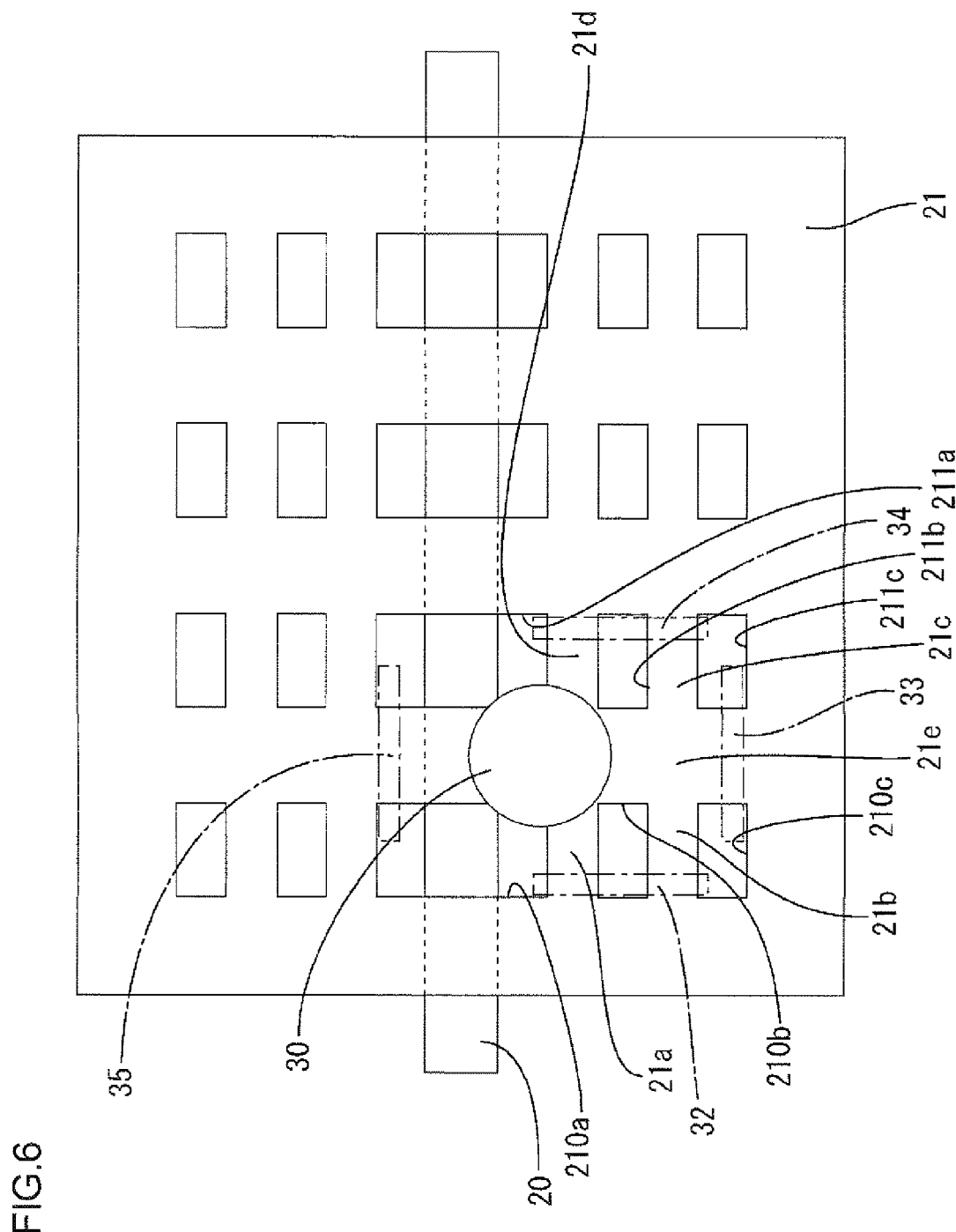
FIG. 6 is an explanatory diagram showing the operational effects of the liquid crystal display device according to the present embodiment.

In the liquid crystal display device thus constructed, referring to FIG. 6, when a foreign substance 30 slips into a crossover section 40 at which a storage capacitor line 20 and a peripheral wiring line 21 intersect each other, for example, a fault such as a leak between the lines can be suitably fixed.

Specifically, a portion of the conductive layer 21a or the peripheral wiring line 21) connecting the slit portion 210a and the cutout portion 210b is cut off by laser radiation, so that the slit portion 210a communicates with the cutout portion 210b due to the laser-cut portion (or laser-irradiated portion designated by Symbol 32) as shown in FIG. 6. Similarly, a laser-cut portion (or laser-irradiated portion 32) is formed, so that a portion 21b of the conductive layer (or the peripheral wiring line 21) connecting the cutout portion 210b and the cutout portion 210c is cut off. Further, a laser-cut portion (or laser-irradiated portion 33) is formed, so that a portion 21e of the conductive layer (or the peripheral wiring line 21) connecting the cutout portion 210c and the cutout portion 211c is cut off. A laser-cut portion (or laser-irradiated portion 34) is formed, so that a portion 21c of the conductive layer (or the peripheral wiring line 21) connecting the cutout portion 211b and the cutout portion 211c is cut off. A laser-cut portion (or laser-irradiated portion 34) is formed, so that a portion 21d of the conductive layer (or the peripheral wiring line 21) connecting the slit portion 211a and the cutout portion 211b is cut off. Consequently, the defective part attributable to the foreign substance 30 is electrically isolated, and thereby a failure caused by a fault such as a leak can be fixed.

According to the construction, the cutout portions 210b and the like linearly aligned with the slit portions 210a and the like are provided so that a defective area can be separated off. Thereby, a defect over a large area can be fixed, and therefore intrusion of a relatively-large foreign substance can be treated. Particularly compared to simply increasing the lengths of the slit portions 210a and the like in order to enable repair of a larger defective area, increase of the resistance of the peripheral wiring lines 21 can be suppressed according to the present construction, which may prevent degradation of display performance.

Further, in the present embodiment, the slit portions 210a and the like are arranged parallel to one another, while the cutout portions 210b and the like are arranged to be aligned with the respective slit portions 210a and the like. That is, the cutout portions 210b and the like are arranged in an array of rows and columns. Due to the parallel arrangement of the slit portions 210a and the like and further due to the cutout portions 210b and the like aligned with the parallels slit portions 210a and the like, the above cutting operation can be advanced in the longitudinal direction of the slit portions 210a and the like, or a direction (i.e., the array direction of the slit portions 210a and the like) intersecting with the longitudinal direction. Thus, the cutting operation is facilitated. Specifically, during the laser cutting operation described above, the laser scanning can be advanced in either of the vertical and horizontal directions which intersect each other at an angle of 90 degrees. Thus, the laser scanning is facilitated, and consequently the precision of irradiation can be improved. Specifically, the portions of the peripheral wiring line 21 connecting the slit portions 210a and the like and the cutout portions 210b and the like can be cut off along the longitudinal direction of the silt portions 210a and the like. The portions of the peripheral wiring line 21 connecting the parallel slit portions 210a and the like, or the portions of the peripheral wiring line 21 connecting the cutout portions 210b and the like arranged in a line can be cut off along the array direction of the slit portions 210a and the like.

Each of the cutout portions 210b and the like has a rectangular shape with 6.0 μm to 10.0 μm sides. Thereby, the precision of laser cutting can be improved. That is, the cutting can be optimally achieved due to the cutout portions 210b and the like each having a rectangular shape with 6.0 μm to 10.0 μm sides, because the laser beam width is several micrometers. If each side of the cutout portions 210b and the like is set to be less than 6.0 μm, the scanning laser may need to turn at a tangible portion of the peripheral wiring line 21. If it is set to exceed 10.0 μm, the resistance of the peripheral wiring line 21 may be unnecessarily increased.

Next, a manufacturing method for the liquid crystal display device will be explained.

The following explanation will mainly focus on a repair process of the manufacturing process.

First, a pair of substrates 2, 3 formed of light transmissive glass substrates should be prepared.

Then, scanning lines 19 and storage capacitor lines 20 are Formed on the substrate 2, and a gate insulator 24 is formed on the lines. Further, data lines 18 and peripheral wiring lines 21 are formed on the gate insulator 24. Note that the storage capacitor lines 20 and the peripheral wiring lines 21 are formed to intersect each other out of the display area as shown in FIGS. 3 to 5.

In the process of forming the peripheral wiring lines 21, slit portions 210a and the like and cutout portions 210b and the like arranged in a pattern shown in FIGS. 3 to 5 are formed by mask etching using a photolithographic method. TFTs 16 and pixel electrodes 17 are further formed on the substrate 2, and an alignment Film (not shown) is formed on the pixel electrodes 17.

On the other hand, a color filter (not shown) is formed on the substrate 3, if required. Further, a common electrode 6 is formed, and an alignment film (not shown) is formed on the common electrode 6.

After the electrodes and the like are thus formed on the substrates 2, 3, a sealant 7 is formed on one of the substrates 2, 3, and liquid crystal is dispensed into the inner region of the sealant 7. Then, the substrates 2, 3 are attached to each other via the sealant 7. A polarizing plate and the like are further placed, and then the manufacturing process of the liquid crystal display device 1 shown in FIGS. 1 and 8 is completed.

In the manufacturing method of the present embodiment, if a foreign substance 30 shown in FIG. 6 slips into a crossover section 40 (See FIGS. 3 to 5) at which a storage capacitor line 20 and a peripheral wiring line 21 intersect each other, a repair process is performed for fixing a leak that may occur between the storage capacitor line 20 and the peripheral wiring line 21. In the repair process, some portions of the peripheral wiring line 21 connecting the slit portions 210a and the like and the cutout portions 210b and the like are cut off by laser for repairing purpose.

Specifically, a portion 21a of the conductive layer (or the peripheral wiring line 21) connecting the slit portion 210a and the cutout portion 210b is cut off by laser radiation, so that the slit portion 210a communicates with the cutout portion 210b due to the laser-cut portion (or laser-irradiated portion 32) as shown in FIG. 6. Similarly, a laser-cut portion (or laser-irradiated portion 32) is formed, so that a portion 21b of the conductive layer (or the peripheral wiring line 21) connecting the cutout portion 210b and the cutout portion 210c is cut off. Further, a laser-cut portion (or laser-irradiated portion 33) is formed, so that a portion 21e of the conductive layer (or the peripheral wiring line 21) connecting the cutout portion 210c and the cutout portion 211c is cut off. A laser-cut portion (or laser-irradiated portion 34) is formed, so that a portion 21c of the conductive layer (or the peripheral wiring line 21) connecting the cutout portion 211b and the cutout portion 211c is cut off. A laser-cut portion (or laser-irradiated portion 34) is formed, so that a portion 21d of the conductive layer (or the peripheral wiring line 21) connecting the slit portion 211a and the cutout portion 211b is cut off. Consequently, the defective area attributable to intrusion of the foreign substance 30 is electrically isolated, and thereby a failure caused by a fault such as a leak can be fixed.

The manufacturing method of the present embodiment thus including the repair process enables provision of a highly reliable liquid crystal display device. That is, even when a relatively-large foreign substance or the like slips in, the intrusion spot can be fixed due to the slit portions 210a and the like and the cutout portions 210b and the like provided in each crossover section at which the lines 20, 21 intersect each other. Thus, a defect over a large area can be fixed. Further, increase of the resistance of the peripheral wiring lines 21 can be suppressed, because the cutout portions 210b and the like aligned with the slit portions 210a and the like are provided in order to enable repair of a larger defective area, instead of simply extending the slit portions 210a and the like in order to enable repair of a larger defective area.

Particularly in the case where isolation of a foreign substance spot is achieved by laser cutting as in the manufacturing method of the present embodiment, the laser cutting can be advanced while involving 90-degree turns of the scanning laser (or scanning light), due to the rectangular (specifically, square in the present embodiment) cutout portions 210b and the like arranged in an array of rows and columns. That is, referring to FIG. 6, when each laser-cut portion 32, 33, 34 is formed by laser radiation so that a portion of the peripheral wiring line 21 connecting between the cutout portions 210b and the like arranged in an array of rows and columns is cut off, the laser scanning direction can be set to either of the vertical and horizontal directions which intersect each other at right angles. Therefore, the laser cutting can be achieved by laser scanning that involves 90-degree turns. Further, a turning point at which the scanning laser turns in direction can be set to a point within any of the cutout portions 210b and the like. Thereby, a cutoff defect at the turning point can be prevented. That is, the turning point can be set to a point within intangible portions of the peripheral wiring lines 21, and therefore the scanning laser can turn in direction while not cutting a wiring line portion. Consequently, a cutoff defect likely generated at the turning point can be prevented. Note that the present embodiment includes an inspection process for checking for the presence of a foreign substance 30 or the like prior to the repair process.

This is the end of explanation of the embodiment according to the present invention. However, the present invent on is not limited to the embodiment explained in the above description made with reference to the drawings. The following embodiments may be included in the technical scope of the present invention, for example.

(1) In the above embodiment, the slit portions 210a and the like and the cutout portions 210b and the like are provided on the peripheral wiring lines 21, but rather may be provided on the storage capacitor lines 20.

(2) In the above embodiment, the slit portions 210a and the like and the cutout portions 210b and the like are provided in a crossover section at which a peripheral wiring line 21 and a storage capacitor line 20 intersect each other. However, slit portions and cutout portions can be provided in a crossover section at which various other conductive layers intersect each other.

(3) In the above embodiment, a liquid crystal display device is shown for illustrative purposes. However, the construction according to the present invention can be employed on another type of display device such as an EL display device or a plasma display device.

Figure 9:
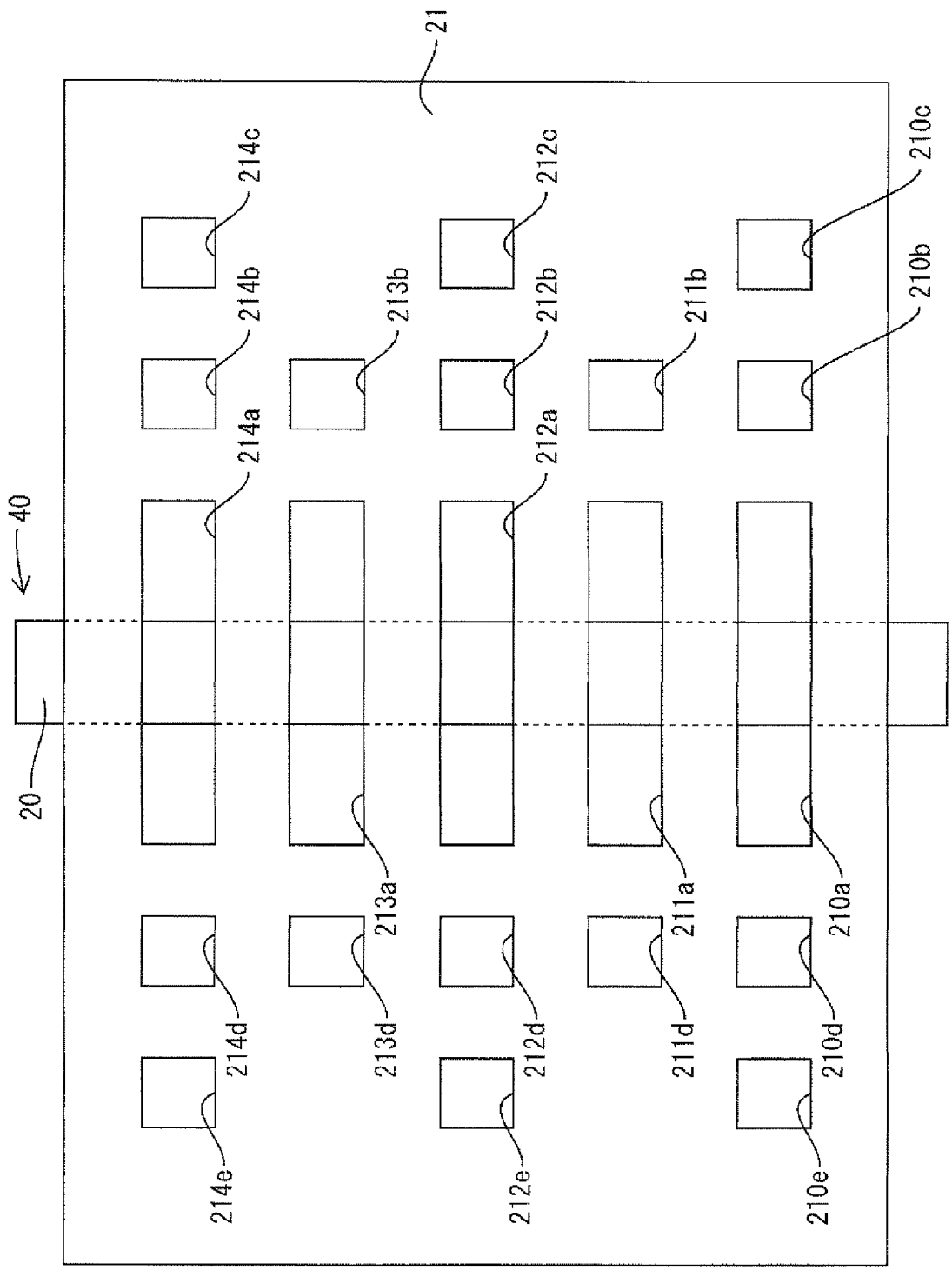
FIG. 9 is a diagram schematically showing a modification of cutout portions.

(4) In the above embodiment, all the cutout portions are arranged evenly spaced apart. However, some of the cutout portions in the second or subsequent columns may be selectively eliminated, for example. Specifically, the arrangement may be formed as shown in FIG. 9, in which the cutout portions aligned with the first slit portion 210a include cutout portions 210b, 210d in the first columns and cutout portions 210c, 210e in the second columns, while the cutout portions aligned with the second slit portion 211a include cutout portions 211b, 211d in the first columns, but the cutout portions in the second columns are eliminated therefrom.

Figure 10:
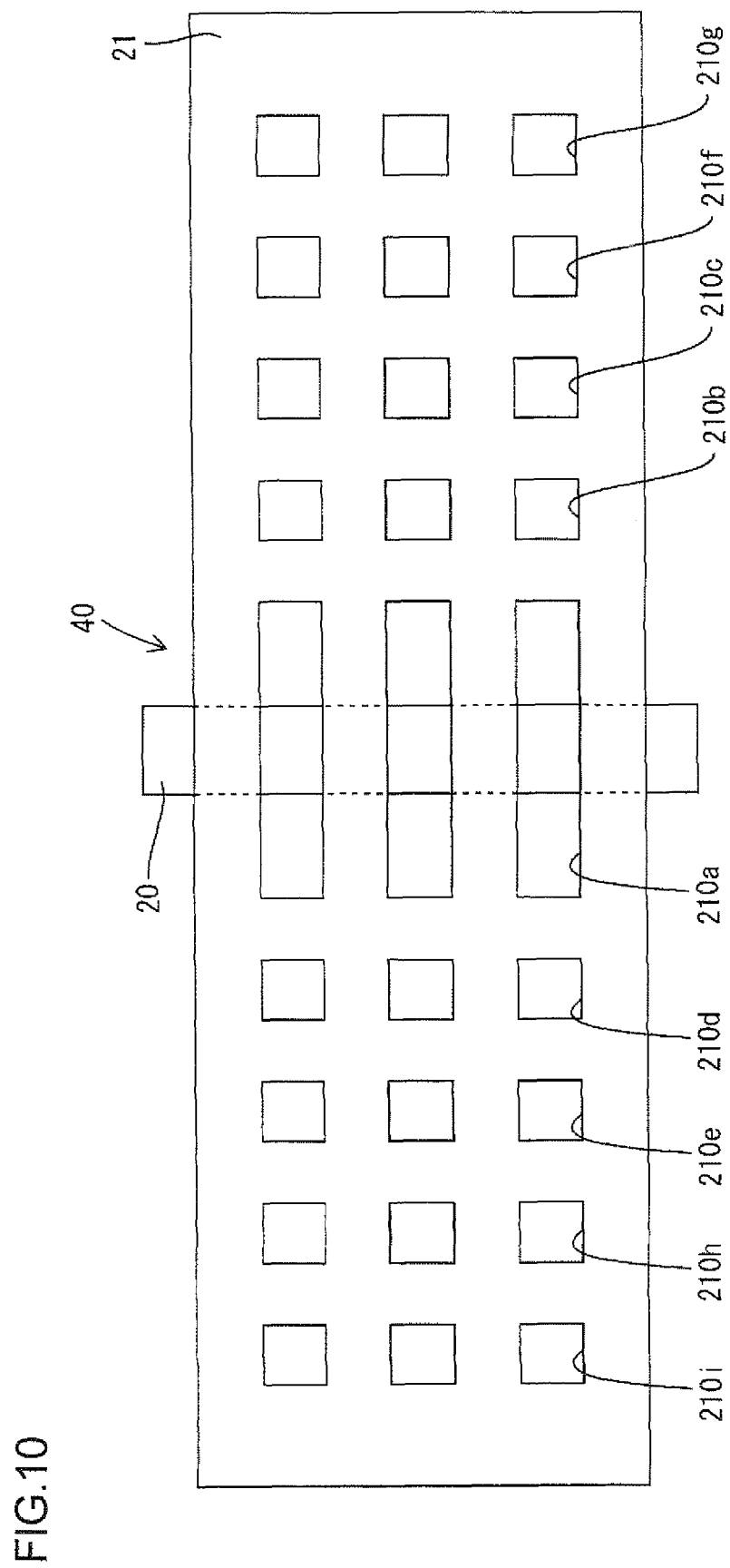
FIG. 10 is a diagram schematically showing another modification of the cutout portions.

(5) In the above embodiment, two columns of cutout portions 210*b* and the like are provided on each side of the slit portions 210*a* and the like. However, any number of columns can be provided as long as the wiring resistance is within the permissible limits. For example, four columns may be provided on each side as shown in FIG. 10.

Figure 11:
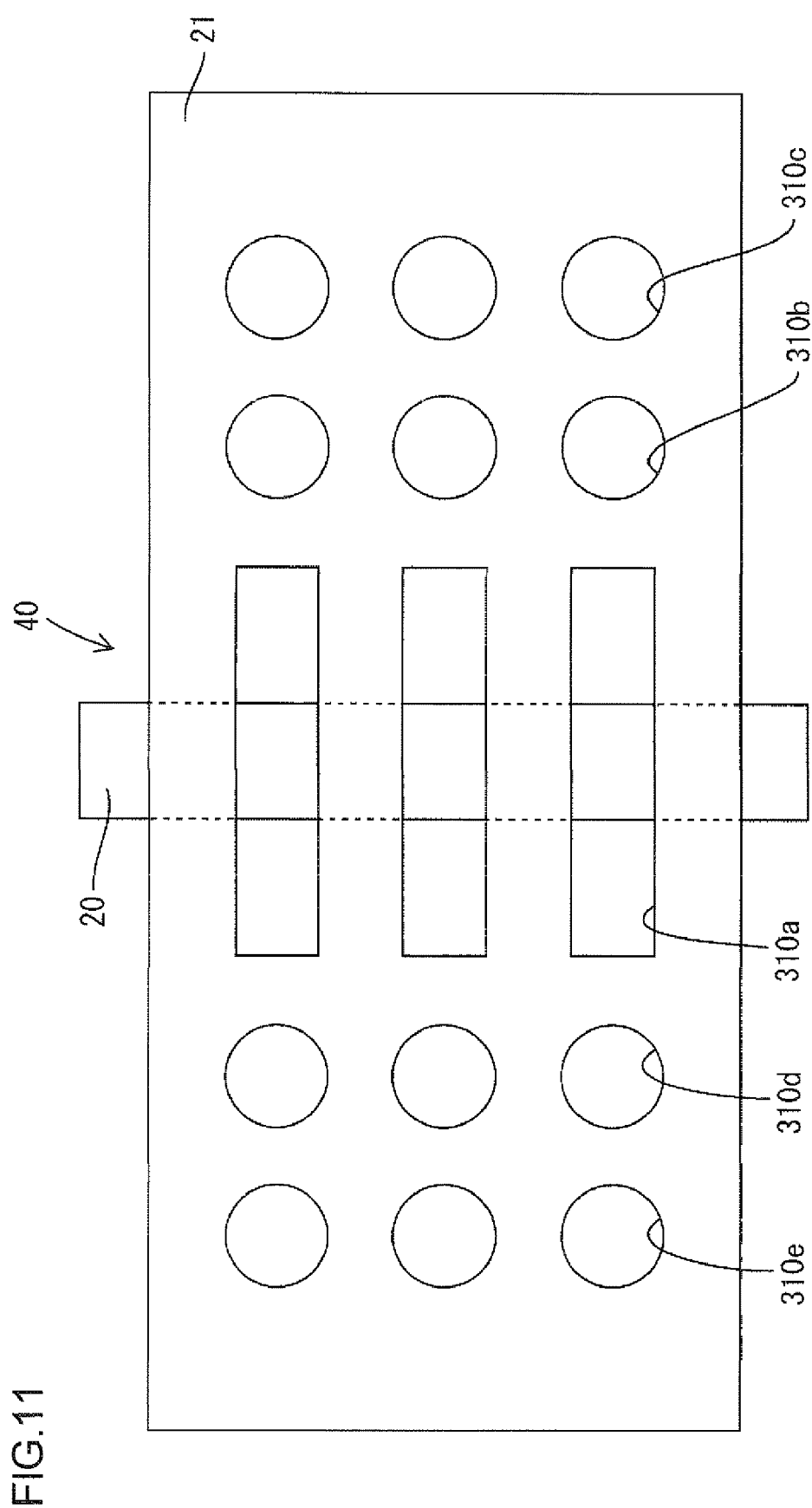
FIG. 11 is a diagram schematically showing another modification of the cutout portions.

(6) in the above embodiment, each of the cutout portions 210*b* and the like is formed into a rectangular shape. However, cutout portions 310*b* and the like, each having a circular shape, may be formed as shown in FIG. 11, for example, as long as the opening size of each cutout portion is set to be larger than the laser beam width.

Figure 12:
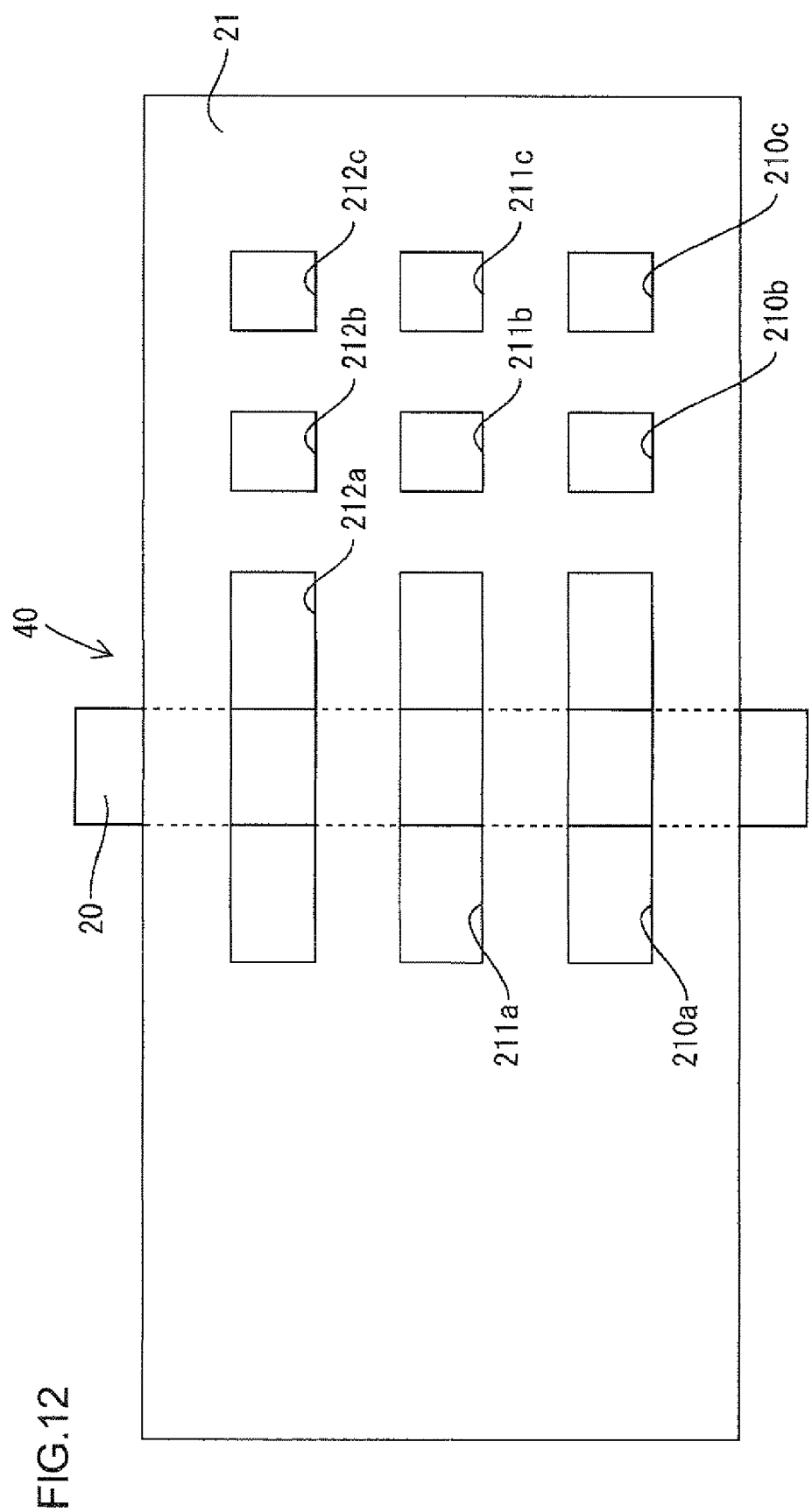
FIG. 12 is a diagram schematically showing another modification of the cutout portions.

(7) In the above embodiment, the cutout portions 210*b*, 210*d* and the like are arranged on both sides of the slit 210*a*. However, the cutout portions 210*b* may be arranged on one side of the slit 210*a* as shown in FIG. 12, for example.

Figure 13:
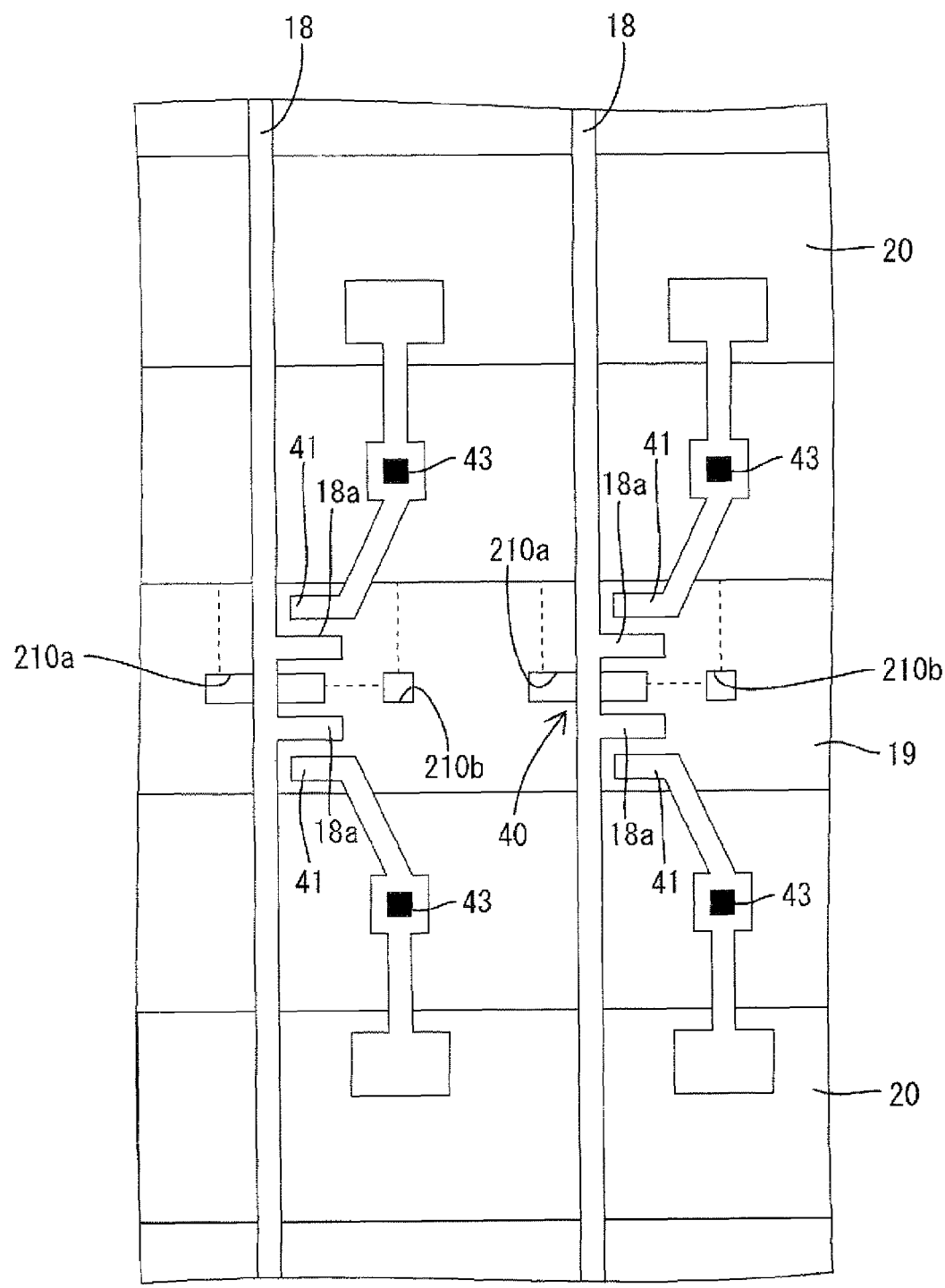
FIG. 13 is a diagram schematically showing another modification of the cutout portion.

(8) In the case that a cutout portion 210*b* on one side of a slit 210*a* is formed in a section (i.e., a crossover section 40) at which a data line 18 and a scanning line 19 intersect each other, the slit 210*a* and the cutout portion 210*h* can be arranged as shown in FIG. 13, for example. In this case, when the data line 18 and the scanning line 19 are short-circuited due to intrusion of a foreign substance, the short circuit spot can be cut off (or isolated) by laser irradiation along dashed lines shown in FIG. 13. In FIG. 13, Symbol 18*a* designates a source electrode, while Symbol 41 designates a drain electrode. When a scan signal is supplied to a gate electrode (not shown) from the scanning line 19, the source electrode 18*a* is conductively connected to the drain electrode 41 so that a data signal is supplied to the drain electrode 41 from the source electrode 18*a*. The data signal is transmitted to the pixel electrode (not shown) via a contact 43.

The invention claimed is:

1. A display device comprising:
a first conductive layer;
a second conductive layer arranged across at least an insulating layer from said first conductive layer, wherein:
said second conductive layer includes a plurality of slits arranged parallel to each other and a plurality of cutouts smaller than said slits in an overlap section including an area where said first conductive layer and said second conductive layer overlap;
each of said slits comprises an elongated shape and a length longer than a width of the first conductive layer so as to extend over said first conductive layer in a width direction of said first conductive layer and formed in said area where the first conductive layer and the second conductive layer overlap each other;
said cutouts are separate from said slits and arranged on an extended line of a long axis of each of said slits and in a grid such that a whole of each cutout is in an area of the second conductive layer where the first conductive layer and any other conductive layer do not overlap the second conductive layer in plan view.

2. The display device of claim 1, wherein said cutouts are symmetrically arranged on both sides of each of said slits.

3. The display device of claim 1, wherein said cutouts are arranged at intervals, each of which is an integral multiple of an interval between adjacent ones of said slits.

4. The display device of claim 1, wherein each of said cutouts has a rectangular shape, each side of which has a length between 6 μm and 10 μm.

* * * * *